United States Patent
Qu et al.

(10) Patent No.: US 10,830,289 B2
(45) Date of Patent: Nov. 10, 2020

(54) ELECTROMAGNETIC CLUTCH OF A BRUSHLESS CONTROL-BY-WIRE CENTRIFUGAL BALL ARM ENGAGEMENT DEVICE

(71) Applicant: Shandong University of Technology, Zibo (CN)

(72) Inventors: Jinyu Qu, Zibo (CN); Chuanbo Ren, Zibo (CN); Zhengbin Guo, Zibo (CN); Pan Zhang, Zibo (CN); Chen Qi, Zibo (CN); Nana Lv, Zibo (CN)

(73) Assignee: Shandong University of Technology, Zibo (CN)

( * ) Notice: Subject to any disclaimer, the term of this patent is extended or adjusted under 35 U.S.C. 154(b) by 8 days.

(21) Appl. No.: 15/772,408

(22) PCT Filed: May 22, 2017

(86) PCT No.: PCT/CN2017/085318
§ 371 (c)(1),
(2) Date: Dec. 13, 2018

(87) PCT Pub. No.: WO2018/126593
PCT Pub. Date: Jul. 12, 2018

(65) Prior Publication Data
US 2019/0390720 A1     Dec. 26, 2019

(30) Foreign Application Priority Data

Jan. 9, 2017   (CN) .......................... 2017 1 0015009

(51) Int. Cl.
*F16D 27/08*   (2006.01)
*F16D 27/14*   (2006.01)

(52) U.S. Cl.
CPC ............. *F16D 27/08* (2013.01); *F16D 27/14* (2013.01)

(58) Field of Classification Search
CPC ........... F16D 27/08; F16D 27/14; F16D 27/04
See application file for complete search history.

(56) References Cited

U.S. PATENT DOCUMENTS

| | | | | |
|---|---|---|---|---|
| 5,810,141 A | * | 9/1998 | Organek | ................. F16D 13/04 |
| | | | | 192/35 |
| 6,880,688 B2 | * | 4/2005 | Matsumoto | ........... F16D 27/115 |
| | | | | 192/35 |

(Continued)

FOREIGN PATENT DOCUMENTS

| | | |
|---|---|---|
| CN | 2446143 Y | 9/2001 |
| CN | 105156503 A | 12/2015 |

(Continued)

*Primary Examiner* — David R Morris
*Assistant Examiner* — Lillian T Nguyen
(74) *Attorney, Agent, or Firm* — Jason R. Jones

(57) ABSTRACT

An electromagnetic clutch of a brushless control-by-wire centrifugal ball arm engagement device includes a brushless electromagnet, a thrust pressing disc, a driven inner-spline hub, a control-by-wire drive disc, a centrifugal ball arm hollow disc, centrifugal ball arm pins, centrifugal ball arms, centrifugal balls, a magnetic conductive force transmitting disk, a drive shaft; once the brushless electromagnet is energized, the centrifugal ball arms and the centrifugal balls each make a circular motion around the centrifugal ball arm pin outwardly along the smooth surface of the thrust pressing disc by the action of centrifugal force produced by them when rotating with high speed. The component of the centrifugal force in the direction of the central axis of the centrifugal ball arm hollow disc drives the thrust pressing disc to compress the outer-spline-groove steel sheets and the inner-spline-groove friction discs with each other, which makes the clutch engaged.

1 Claim, 1 Drawing Sheet

(56) References Cited

U.S. PATENT DOCUMENTS

| | | | |
|---|---|---|---|
| 6,905,008 B2* | 6/2005 | Kowalsky | F16D 27/115 |
| | | | 192/35 |
| 6,935,475 B2* | 8/2005 | Weilant | F16D 27/115 |
| | | | 180/247 |
| 2010/0236888 A1* | 9/2010 | Pritchard | F16D 27/115 |
| | | | 192/35 |

FOREIGN PATENT DOCUMENTS

| | | | |
|---|---|---|---|
| CN | 205089855 U | | 3/2016 |
| CN | 106545595 A | | 3/2017 |
| CN | 106641123 A | * | 5/2017 |

* cited by examiner

ELECTROMAGNETIC CLUTCH OF A BRUSHLESS CONTROL-BY-WIRE CENTRIFUGAL BALL ARM ENGAGEMENT DEVICE

The present application claims priority to a Chinese patent application No. 201710015009.3, filed on Jan. 9, 2017 before Chinese Patent Office, with a title of an electromagnetic clutch of a brushless control-by-wire centrifugal ball arm engagement device, which is incorporated herein by reference in its entirety.

FIELD

The present invention relates to a clutch, more specifically, an electromagnetic clutch of a brushless control-by-wire centrifugal ball arm engagement device.

BACKGROUND

The conventional electromagnetic clutches can be classified as the following types: friction disk electromagnetic clutch, jaw electromagnetic clutch, magnetic powder clutch and slip electromagnetic clutch and so on. When engaged, the friction disk electromagnetic clutch transmits torque by means of the friction force generated between a drive friction disc and a driven friction disc which are compressed by the electromagnetic force generated by energizing an electromagnetic coil. In order to transmit a large torque, it is necessary to increase the radial dimension of an input disc and a driven disc, the electromagnetic coil's energizing current as well as the numbers of the drive friction discs and driven friction discs. Therefore, the friction disk electromagnetic clutch has such drawbacks as large size, low rotation speed and high power consumption; the jaw electromagnetic clutch has a drawback of high power consumption due to its large transmission torque and a requirement for low rotation speed differential when engaged; the magnetic powder clutch can take response quickly and make a fine adjustment based on the magnitude of the current, but involves such shortcomings as large power consumption, high temperature rise in case of large slip, as well as high cost; when the slip electromagnetic clutch is operated, a torque transmission occurs only with a certain speed differential between a drive part and a driven part, and the eddy current in the rotor may generate heat which is proportional to the speed differential.

SUMMARY

In view of the drawbacks of the conventional electromagnetic clutch, the object of the present invention is to provide a novel structured electromagnetic clutch of a brushless control-by-wire centrifugal ball arm engagement device, with large transmission torque, high rotation speed and low power consumption. The technical solution of the invention is as follows:

an electromagnetic clutch of a brushless control-by-wire centrifugal ball arm engagement device, which comprises an input shaft, an output shaft, an output shaft connecting disc and a brushless electromagnet, is characterized in that:

the electromagnetic clutch further comprises a brushless control-by-wire centrifugal ball arm engagement device;

the brushless control-by-wire centrifugal ball arm engagement device comprises a thrust pressing disc, a driven inner-spline hub, a control-by-wire driving disc, a preloading spring, a centrifugal ball arm hollow disc, centrifugal ball arm pins, centrifugal ball arms, centrifugal balls, a magnetic conductive force transmitting disk, centrifugal ball sockets and a drive shaft;

the drive shaft has one end fixedly connected to one end of the input shaft; the centrifugal ball arm hollow disc is installed and supported on the intermediate journal of the drive shaft by a bearing, and is provided with an outer-spline grooves of centrifugal ball arm hollow disc on the outer circumferential surface of its end close to the input shaft; the control-by-wire drive disc is arranged on the outer-spline grooves of centrifugal ball arm hollow disc by its inner-spline grooves; the preloading spring is disposed between the end of the outer-spline grooves of centrifugal ball arm hollow disc and the inside end face of the control-by-wire drive disc; the control-by-wire drive disc is further provided with a friction driving end face at its end face close to the input shaft; the centrifugal ball arm hollow disc is provided with a plurality of centrifugal ball arm holders which are evenly arranged in the circumferential direction at its other end away from the input shaft, the centrifugal ball arm holders each having one centrifugal ball arm pin fixedly mounted thereon; the centrifugal ball arm has one end mounted on the intermediate journal of the centrifugal ball arm pin by its smooth bearing hole and is rotatable freely around the centrifugal ball arm pin; the centrifugal ball arm has the other end provided with one centrifugal ball socket, in each of which a centrifugal ball is provided and capable of rolling freely;

the thrust pressing disc has one end face being a smooth end surface, on which the centrifugal ball each abuts against, and further has an outer-spline groove provided on its outer circumferential surface; the outer-spline grooves of the thrust pressing disc is axially in sliding engagement with the inner-spline grooves of the driven inner-spline hub; the driven inner-spline hub has an end face, which is away from the input shaft, fixedly connected to the output shaft connecting disc; the output shaft connecting disc is fixedly mounted on the output shaft;

the magnetic conductive force transmitting disk is fixedly mounted on the journal of the drive shaft by a bearing hole of the center hub of magnetic conductive force transmitting disk; the magnetic conductive force transmitting disk is provided with an outer disc of magnetic conductive force transmitting disk, one end face of which close to the friction driving end face keeps an air gap from the friction driving end face by the action of the preloading spring, the other end face of which is always keeping an air gap from a magnetic pole end face of the brushless electromagnet.

Compared with the prior art, the present invention has advantages as follows:

According to the electromagnetic clutch of a brushless control-by-wire centrifugal ball arm engagement device of the present invention, the centrifugal ball arms and the centrifugal balls each make a circular motion around the centrifugal ball arm pins outwardly along the smooth surface of the thrust pressing disc by the action of centrifugal force produced by them when rotating with high speed. The component of the centrifugal force in the direction of the central axis of the centrifugal ball arm hollow disc drives the thrust pressing disc to compress the outer-spline-groove steel sheets and the inner-spline-groove friction discs with each other, which makes the clutch engaged. The clutch is engaged smoothly and with no impact, which is suitable for high-speed rotation and can transmit large torque, and the use of brushless electromagnet helps increase its working life.

wherein,

1WT brushless electromagnet, 1WTa magnetic pole end face, 11 input shaft, 21 output shaft, 21P output shaft connecting disc, 10 brushless control-by-wire centrifugal ball arm engagement device, 10a inner-spline-groove friction discs, 10b outer-spline-groove steel sheets, 10c thrust pressing disc, 10ca smooth surface, 10d driven inner-spline hub, 10e end cover of driven inner-spline hub, 10f locking disc, 10g control-by-wire drive disc, 10ga friction driving end face, 10i preloading spring, 10j centrifugal ball arm hollow disc, 10ja outer-spline grooves of centrifugal ball arm hollow disc, 10k centrifugal ball arm pins, 10l centrifugal ball arms, 10m centrifugal balls, 10p centrifugal ball arm return springs, 10q magnetic conductive force transmitting disk, 10qa center inner hub of magnetic conductive force transmitting disk, 10qb outer disc of magnetic conductive force transmitting disk, 10r centrifugal ball sockets, 10Z drive shaft.

DETAILED DESCRIPTION

The embodiments of the present invention will now be described in detail with reference to the accompanying drawings according to the embodiments of the present invention. It is obvious that the described embodiments are merely some but not all of the embodiments of the present invention; all the other embodiments derived by those skilled people in the art based on the embodiment of the present invention without making any creative efforts fall into the protection scope of the present invention.

Figure 1:
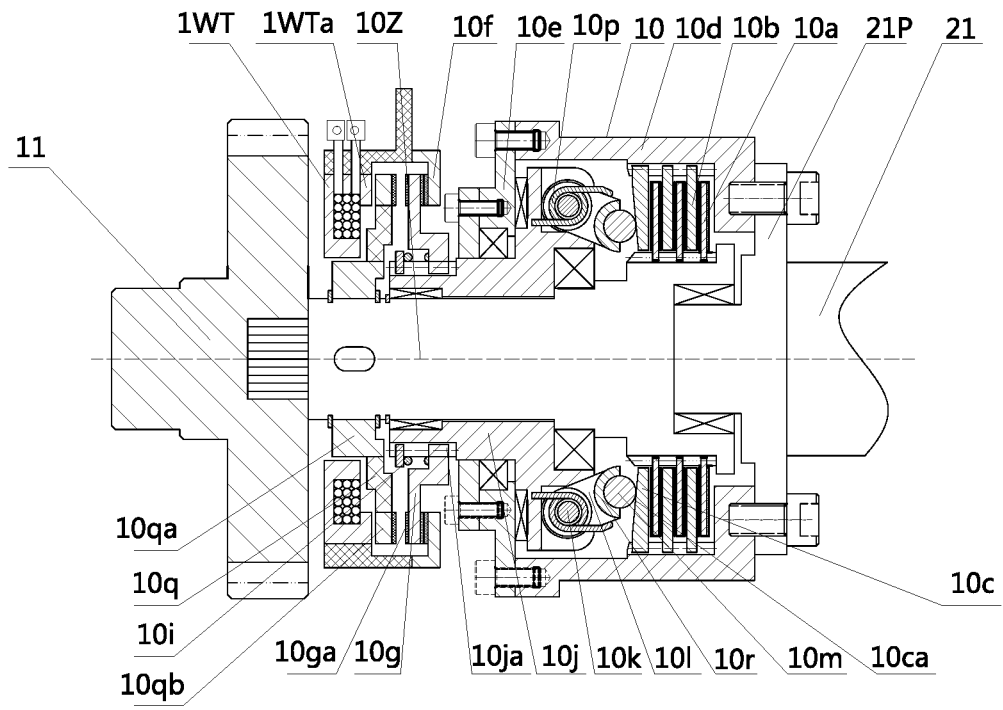
FIG. 1 is a structural diagram of the electromagnetic clutch of a brushless control-by-wire centrifugal ball arm engagement device according to an embodiment of the present invention.

As shown in FIG. 1, the electromagnetic clutch of a brushless control-by-wire centrifugal ball arm engagement device according to the present invention may comprise an input shaft 11, an output shaft 21, an output shaft connecting disc 21P, a brushless electromagnet 1WT, a brushless control-by-wire centrifugal ball arm engagement device 10.

The engagement device of brushless control-by-wire centrifugal ball arm 10 may comprise inner-spline-groove friction discs 10a, outer-spline-groove steel sheets 10b, a thrust pressing disc 10c, a driven inner-spline hub 10d, an end cover of driven inner-spline hub 10e, a locking disc 10f, a control-by-wire drive disc 10g, a preloading spring 10i, a centrifugal ball arm hollow disc 10j, centrifugal ball arm pins 10k, centrifugal ball arms 10l, centrifugal balls 10m, centrifugal ball arm return springs 10p, a magnetic conductive force transmitting disk 10q, centrifugal ball sockets 10r and a drive shaft 10Z.

The inner-spline-groove friction discs 10a are sheathed on the outer-spline grooves of the drive shaft 10Z by means of its inner-spline grooves; the drive shaft 10Z has one end fixedly connected to the input shaft 11 by a spline, and the other end connected to the front journal of the output shaft 21 by a bearing; the centrifugal ball arm hollow disc 10j is installed and supported on the intermediate journal of the drive shaft 10Z by a bearing, and it is provided with the outer-spline grooves of centrifugal ball arm hollow disc 10ja on the outer circumferential surface of its end close to the input shaft 11, the control-by-wire drive disc 10g is sheathed on the outer-spline grooves of centrifugal ball arm hollow disc 10ja by its inner-spline grooves; the centrifugal ball arm hollow disc 10j is provided with a plurality of centrifugal ball arm holders which are evenly arranged in the circumferential direction at the other end away from the input shaft 11; each centrifugal ball arm holder being fixedly mounted with one centrifugal ball arm pin 10k; the centrifugal ball arm 10 has one end mounted on the intermediate journal of the centrifugal ball arm pin 10k by its smooth bearing hole, and each can rotate freely around the centrifugal ball arm pin 10k; the centrifugal ball arm 10l has the other end provided with one centrifugal ball socket 10r, each of which has one centrifugal ball 10m capable of rolling freely therein; the thrust pressing disc 10c has one end face being a smooth surface 10ca, on which each centrifugal ball 10m abuts against, and has the other end face being a rough friction surface; on the outer circumferential surface, the thrust pressing disc 10c are further provided with outer-spline grooves which are axially in sliding engagement with the inner-spline grooves of the driven inner-spline hub 10d; the driven inner-spline hub 10d has one end, which is close to the input shaft 11, fixedly connected to the end cover of driven inner-spline hub 10e by a bolt, and has the other end, which is away from the input shaft 11, fixedly connected to the output shaft connecting disc 21P, and the outer-spline-groove steel sheets 10b are sheathed over the inner-spline grooves of the driven inner-spline hub 10d by its outer-spline grooves; the output shaft connecting disc 21P is fixedly mounted on the output shaft 21; the locking disc 10f and the brushless electromagnet 1WT each are fixedly mounted on the clutch case by a non-magnetic conductive material, and has the control-by-wire drive disc 10g disposed there between; the control-by-wire drive disc 10g is provided with an friction driving end face 10ga at its one end face close to the input shaft 11; the magnetic conductive force transmitting disk 10q is fixedly mounted on the journal of the drive shaft 10Z through a bearing hole of the center inner hub of magnetic conductive force transmitting disk 10qa; the magnetic conductive force transmitting disk 10q is provided with an outer disc of magnetic conductive force transmitting disk 10qb, whose one end face close to the friction driving end face 10ga keeps an air gap from the friction driving end face 10ga by the action of the preloading spring 10i, and the other end face always keeps an air gap from the magnetic pole end face 1WTa of the brushless electromagnet 1WT.

The operation principle of the electromagnetic clutch of a brushless control-by-wire centrifugal ball arm engagement device according to the embodiment of the present invention will be further described with reference to FIG. 1 and FIG. 2.

When the electromagnetic clutch of a brushless control-by-wire centrifugal ball arm engagement device is in disengaged state, as shown in FIG. 1, the electromagnetic coil is deenergized, thus the control-by-wire drive disc 10g are engaged with the locking disc 10f by the elastic force of the preloading spring 10i, and with the locking disc 10f fixed stationarily to the clutch case, the friction force between the engaged control-by-wire drive disc 10g and the locking disc 10f enables the control-by-wire drive disc 10g along with the centrifugal ball arm hollow disc 10j at a standstill. The centrifugal ball arms 10l are folded inwardly together along with the centrifugal balls 10m by the twisting of the centrifugal ball arm return springs 10p, so that the brushless control-by-wire centrifugal ball arm engagement device 10 does not transmit power, that is, the clutch is in the disengaged state.

Figure 2:
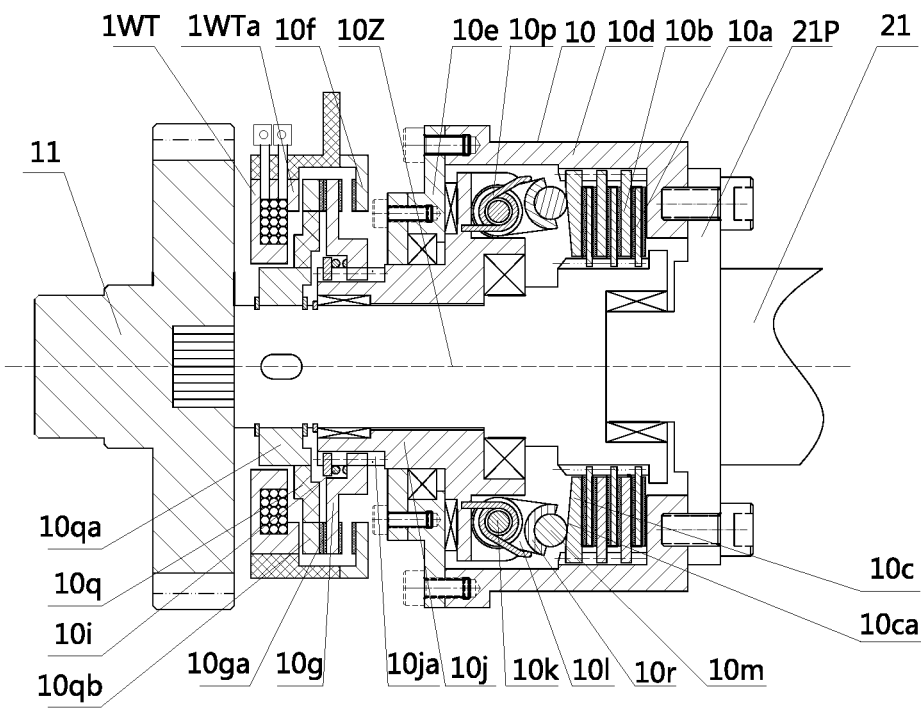
FIG. 2 is a structural diagram of the electromagnetic clutch of a brushless control-by-wire centrifugal ball arm engagement device according to an embodiment of the present invention in energized and engaged state.

When the electromagnetic clutch of a brushless control-by-wire centrifugal ball arm engagement device is engaged, as shown in FIG. 2, the electromagnetic coil is energized and the electromagnetic clutch of a brushless control-by-wire centrifugal ball arm engagement device 10 is operated. After the electromagnetic coil of the brushless electromagnet 1WT is energized, the electromagnetic force generated by the brushless electromagnet 1WT is transmitted to the control-by-wire drive disc 10g via the magnetic conductive force transmitting disk 10q, making the control-by-wire drive disc 10g move in the direction of the brushless electromagnet 1WT against the elastic force of the preloading spring 10i, thereby the friction driving end face 10ga is engaged with one end face of the magnetic conductive force transmitting disk 10q, the friction force generated by their engagement makes the centrifugal ball arm hollow disc 10j rotate, which further makes each centrifugal ball arms 10l rotate. Meanwhile, each centrifugal ball arm 10l is opened outward around the centrifugal ball arm pin 10k by the action of centrifugal force, which makes its end provided with the centrifugal ball socket 10r drive the centrifugal balls 10m to make a circular motion along the smooth surface 10ca of the thrust pressing disk 10c, thereby the centrifugal ball arms 10l generate centrifugal force along with centrifugal balls 10m, the component of the centrifugal force in the direction of the central axis of the centrifugal ball arm hollow disc 10j drives the thrust pressing disc 10c to make an axial movement away from the centrifugal ball arm hollow disc 10j, so that the thrust pressing disc 10c compresses the outer-spline-groove steel sheets 10b and the inner-spline-groove friction discs 10a with each other. The driven inner-spline hub 10d rotates synchronously with the input shaft 11 by the friction force between the outer-spline-groove steel sheets 10b and the inner-spline-groove friction discs 10a, thus 10a, thus the clutch is engaged.

The embodiment of the present invention is described in detail with reference to the accompanying drawings, but it should be noted that, for those skilled in the art, the present invention shall not be limited thereto, and varying improvements and modifications may be made without departing from the gist of the present invention.

The invention claimed is:

1. An electromagnetic clutch of a brushless control-by-wire centrifugal ball arm engagement device, which comprises an input shaft (11), an output shaft (21), an output shaft connecting disc (21P) and a brushless electromagnet (1WT), and is characterized in that:

the electromagnetic clutch further comprises a brushless control-by-wire centrifugal ball arm engagement device (10);

the brushless control-by-wire centrifugal ball arm engagement device (10) comprises a thrust pressing disc (10c), a driven inner-spline hub (10d), a control-by-wire driving disc (10g), a preloading spring (10i), a centrifugal ball arm hollow disc (10j), centrifugal ball arm pins (10k), centrifugal ball arms (10l), centrifugal balls (10m), a magnetic conductive force transmitting disk (10q), centrifugal ball sockets (10r) and a drive shaft (10Z);

the drive shaft (10Z) has one end fixedly connected to one end of the input shaft (11);

the centrifugal ball arm hollow disc (10j) is installed and supported on the intermediate journal of the drive shaft (10Z) by a bearing, and is provided with an outer-spline grooves of centrifugal ball arm hollow disc (10ja) on an outer circumferential surface of one end of the centrifugal ball arm hollow disc (10j) close to the input shaft (11);

the control-by-wire drive disc (10g) is arranged on the outer-spline grooves of centrifugal ball arm hollow disc (10ja) by its inner-spline grooves of the control-by-wire drive disc (10g);

the preloading spring (10i) is disposed between the end of the outer-spline grooves of centrifugal ball arm hollow disc (10ja) and the inside end face of the control-by-wire drive disc (10g);

the control-by-wire drive disc (10g) is further provided with a friction driving end face (10ga) at one end face of the control-by-wire drive disc (10g) close to the input shaft (11);

the centrifugal ball arm hollow disc (10j) is provided with a plurality of centrifugal ball arm holders which are evenly arranged in the circumferential direction at the other end of the centrifugal ball arm hollow disc (10j) away from the input shaft (11) the centrifugal ball arm holders each having one centrifugal ball arm pin (10k) fixedly mounted thereon;

the centrifugal ball arm (10l) has one end mounted on the intermediate journal of the centrifugal ball arm pin (10k) by smooth bearing hole of the centrifugal ball arm (10l) and is rotatable freely around the centrifugal ball arm pin (10k);

the centrifugal ball arm (10l) has the other end provided with one centrifugal ball socket (10r), in each of which a centrifugal ball (10m) is provided and capable of rolling freely;

the thrust pressing disc (10c) has one end face being a smooth end surface (10ca), on which the centrifugal ball (10m) each abuts against, and further has an outer-spline grooves provided on an outer circumferential surface of the thrust pressing disc (10c), the outer-spline grooves of the thrust pressing disc (10c) being axially in sliding engagement with the inner-spline grooves of the driven inner-spline hub (10d);

the driven inner-spline hub (10d) has an end face, which is away from the input shaft (11), fixedly connected to the output shaft connecting disc (21P), the output shaft connecting disc (21P) being fixedly mounted on the output shaft (21);

the magnetic conductive force transmitting disk (10q) is fixedly mounted on the journal of the drive shaft (10Z) by a bearing hole of the center hub of magnetic conductive force transmitting disk (10qa);

the magnetic conductive force transmitting disk (10q) is provided with an outer disc of magnetic conductive force transmitting disk (10qb) one end face of the outer disc of magnetic conductive force transmitting disk (10gb) close to the friction driving end face (10ga) keeps an air gap from the friction driving end face (10ga) by the action of the preloading spring (10i), the other end face of the outer disc of magnetic conductive force transmitting disk (10gb) is always keeping an air gap from a magnetic pole end face (1WTa) of the brushless electromagnet (1WT).

* * * * *

UNITED STATES PATENT AND TRADEMARK OFFICE
CERTIFICATE OF CORRECTION

PATENT NO. : 10,830,289 B2  
APPLICATION NO. : 15/772408  
DATED : November 10, 2020  
INVENTOR(S) : Qu et al.

Page 1 of 1

It is certified that error appears in the above-identified patent and that said Letters Patent is hereby corrected as shown below:

On the Title Page

Item (30), Foreign Application Priority Data is listed incorrectly. The correct number is: 201710015009.3

In the Claims

Column 6, Line 10, delete "its"

Column 6, Line 29, "by smooth" should be "by a smooth."

Column 6, Line 57, "(10gb)" should be "(10qb)"

Column 6, Line 61, "(10gb)" should be "(10qb)"

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*